June 17, 1969     R. GREINER     3,450,247
APPARATUS FOR DISTRIBUTING CANDIES OR THE LIKE
Filed April 10, 1967     Sheet 1 of 2
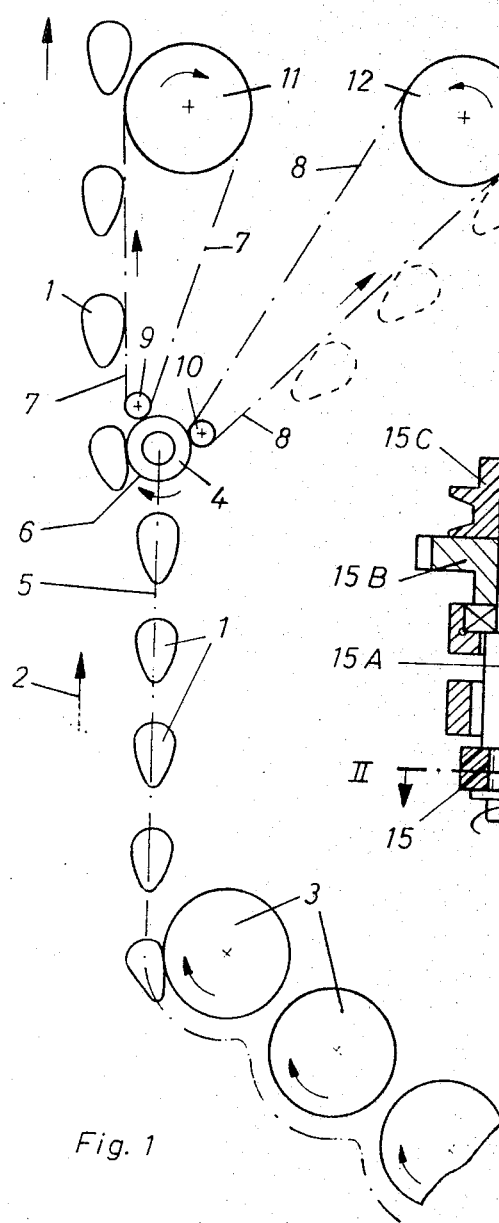
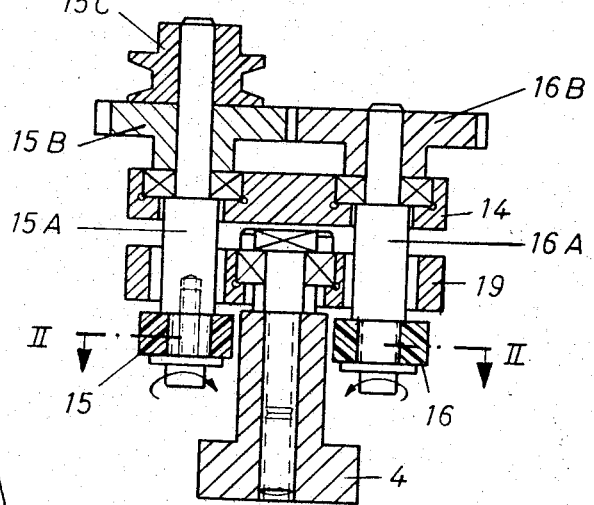
INVENTOR
ROLF GREINER
BY Dicke + Craig
ATTORNEYS united States Patent Office
3,450,247
Patented June 17, 1969

3,450,247
APPARATUS FOR DISTRIBUTING CANDIES
OR THE LIKE
Rolf Greiner, Stuttgart-Vaihingen, Germany, assignor to
Schoko-Buck G.m.b.H., Stuttgart, Germany
Filed Apr. 10, 1967, Ser. No. 629,767
Claims priority, application Germany, Apr. 13, 1966,
Sch 38,821
Int. Cl. B65g 47/26
U.S. Cl. 198—31          8 Claims

ABSTRACT OF THE DISCLOSURE

A simple and inexpensive mechanism for dividing a single row of candies or other objects while being conveyed on a conveyer belt into two or more rows for feeding them to different processing or packing stations.

*Background of the invention*

The present invention relates to a mechanism for conveying pieces of candy or the like in a single row behind each other on a conveyer belt or the like and for dividing this row into two or more rows, each of which may then be passed, for example, to a separate packing station or the like.

In the candy manufacture it is even today conventional to convey the pieces of candy without any orderly arrangement on conveyer belts to the different packing stations where they are picked up individually by hand by several persons who then pack the candies into boxes. However, mechanisms have also already been devised for mechanically aligning the originally irregularly arranged candies and for drawing them apart at suitable distances from each other on the conveyor belt and for then feeding them in such orderly arrangement, for example, to a packing station where they are mechanically inserted into boxes.

*Summary of the invention*

It is an object of the present invention to provide an improved mechanism for handling pieces of candy or the like and, more particularly, for aligning them mechanically in a very simple and inexpensive manner so as to convey them to several further processing stations, for example, to several packing stations where they may be inserted by mechanical means into boxes.

For attaining this object, the present invention provides a controlled deflecting and distributing device which is located directly in alignment with a single row of candies on a conveyor belt and guides these candies when engaging against it selectively toward one or the other side of the device where they are then further conveyed in several rows to different processing or packing stations. This deflecting device is preferably provided with contact surfaces which are movable selectively in one or another direction. According to a very simple and inexpensive embodiment of the invention, this deflecting device consists of a roller which may be rotated selectively in one or the other direction.

More specifically, a preferred embodiment of the invention which is very effective and reliable in actual practice consists in providing the entire deflecting and guiding mechanism in the form of a structural unit which comprises the deflecting roller, a pair of friction wheels or rollers for driving the deflecting roller in one or the other direction, and the control means and driving means for the mechanism. This structural unit is designed so as to be easily mounted at any desired position above any conveyer belt on which candies or other objects are to be conveyed to different processing or packing stations.

The features and advantages of the present invention will become more clearly apparent from the following detailed description thereof which is to be read with reference to the accompanying drawings, in which—

FIGURE 1 shows diagrammatically a top view of the aligning and distributing mechanism according to the invention without its driving means;

FIGURE 3 shows a cross section of the driving means for the deflecting roller, which is taken along the line I—I of FIGURE 2; while

Figure 2:
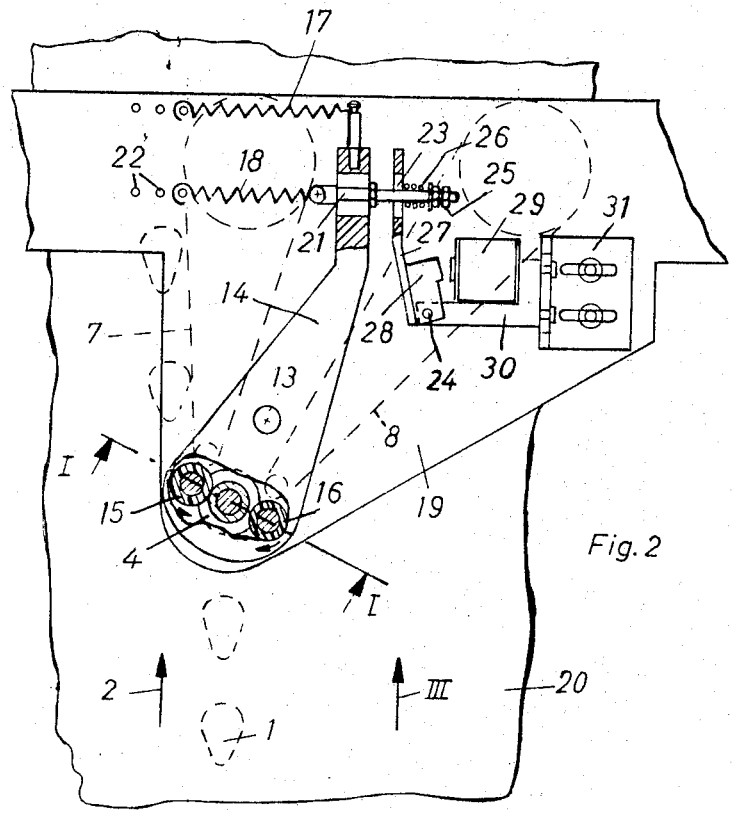
FIGURE 2 shows, partly broken away and in section, a top view of the driving means of the mechanism according to FIGURE 1, wherein a part of these means are shown in a cross section which is taken along the line II—II of FIGURE 3.

As illustrated in FIGURE 1, a series of candies 1 are first conveyed on a conveyer belt traveling in the direction of the arrow 2 on which they are aligned into a single row behind each other by an aligning mechanism which consists of a plurality of rollers 3. The direction of the axis 5 of this row of aligned candies intersects the axis of rotation of a deflecting roller 4. The direction of rotation of this roller 4 is reversible and preferably controlled automatically and in the particular example as illustrated it is shown while rotating in the clockwise direction so as to deflect the candies 1 from the direction of the axis 5 toward the left of this axis. The peripheral surface 6 of the deflecting roller 4 is preferably rubberized or consists of rubber. When being deflected from the axis 5, the candies 1 engage with and are taken along by the contact surface 6 of roller 4 and, due to the friction between the surface of each piece of candy and the contact surface 6 and between the bottom of the candy and the conveyer belt, the candies are guided toward the left so that, when leaving the deflecting roller 4, all of them will be located in the same particular position on the conveyer belt. This position may be controlled and determined by a suitable adjustment of the speed of rotation of the deflecting roller 4 and of the speed of travel of the conveyer belt relative to each other.

In the particular embodiment of the invention as illustrated in the drawings, two guide belts 7 and 8 are provided at both sides of the deflecting roller 4 and are driven in one direction so that the outer side of each belt 7 and 8 facing the candies runs in the direction as indicated by the arrow. These guide belts 7 and 8 which are guided by guide rollers 9 and 10 and drive rollers 11 and 12 serve for drawing the two rows of candies coming from the original single row far enough apart so as to feed them to the particular place or station where they are needed. The speed of travel of guide belts 7 and 8 should be controlled so as to be in such a relation to the speed of travel of the main conveyer belt that the individual pieces of candy while being guided along the belts 7 and 8 will always remain in a particular position from which they will not deviate until they leave these belts on the drive rollers 11 and 12 which preferably turn them in the same direction on the conveyer belt which they followed after leaving the aligning rollers 3. If the conveyer belts 7 and 8 are omitted, for example, because it suffices in a particular case that the single row of candies 1 coming from the aligning rollers 3 is divided into two closely adjacent rows, the candies after leaving the deflecting roller 4 will preferably again assume the same position relative to the conveyer belt as that in which they traveled in the single row.

For driving the deflecting roller 4 as illustrated in

Figure 4:
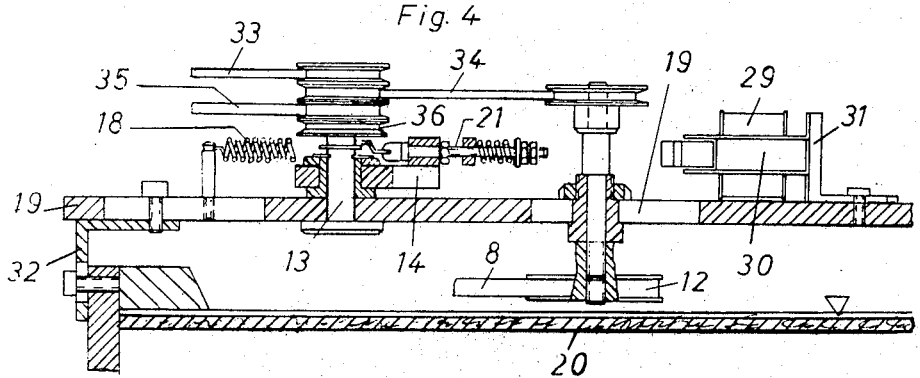
FIGURE 4 shows, partly in section, a side view of the aligning and distributing mechanism as seen in the direction of the arrow III in FIGURE 2, but omitting the deflecting roller together with the two friction wheels.

FIGURE 2 in one or the other direction, the deflecting roller 4 may be moved alternatively into engagement with either of two friction rollers 15 and 16 which are rotatably mounted on a lever 14 which is pivotable about an axis 13 when the lever 14 is pivoted about this axis 13. In the position of lever 14 as indicated, its upper end is pivoted toward the left by the springs 17 and 18 or by only one of them if the other is to be omitted, so that the friction wheel 15 will engage upon the drive shaft of the deflecting roller 4 and rotate the same. The deflecting roller 4 is rotatably mounted on a supporting plate 19 which, in turn, is mounted above the conveyer belt 20 in the manner as illustrated in FIGURES 3 and 4.

The end of lever 14 opposite to the end carrying the friction wheels 15 and 16 carries adjustably secured in an elongated hole in lever 14 a connecting rod 21 into which one end of the spring 18 is hooked, the other end of which may be secured by a suitable pin in one or another of a plurality of holes 22. The other end of this connecting rod 21 is provided with an extension which projects through an elongated hole 23 in an arm which is pivotable about an axis 24 and resiliently connected to an arm 27 by means of a spring 26 and a pair of nuts 25. Arm 27 is provided on its pivotably mounted end with a projection 28 of a magnetic material which may be attracted by an electromagnet 29 when the coil of this magnet is energized by suitable control means. The electromagnet 29 is connected by an angular bracket 30 to a second angular bracket 31 which is screwed to the supporting plate 19 by screws passing through elongated holes in bracket 31. By providing the individual parts of the drive mechanism with elongated holes, it is possible to adjust the apparatus in accordance with different operating conditions.

The electromagnet may be energized, for example, when such a number of candies 1 after being deflected by the deflecting roller 4 toward the left, as shown in FIGURE 1, have passed, for example, into a feeding device for a packing station that a suitable electric impulse will be produced, for example, by a weighing device or by optical scanning. With such an arrangement it is possible first to fill up the feeding belt of one packing station which will then give the control impulse for reversing the direction of rotation of the deflecting roller 4 so that thereafter the feeding belt of a second packing station will be filled. If in the embodiment of the invention as illustrated the coil of the magnet 29 is energized by such an impulse, the magnetic projection 28 and thus also the lever 27 will be attracted by the magnet 29 with the result that the lever 14 will also be pivoted in the clockwise direction about the axis 13 by the connecting rod 21 against the action of the springs 17 and 18. The deflecting roller 4 is thereby moved into engagement with the friction wheel 16 so that the direction of rotation of roller 4 will be reversed and the candies 1 which previously were guided toward the left will now be guided toward the right and be moved by the guide belt 8 across the conveyer belt 20 diagonally to its direction of travel. If a suitable feeding device (not shown) which leads to a second packing station is then filled with the candies which were traveling along the guide belt and were thereafter further taken along by the conveyer belt 20, the circuit of the magnet 29 will be interrupted and lever 14 together with lever 27 will be drawn toward the left by springs 17 and 18 so that the friction wheel 15 will again engage upon the deflecting roller 4.

FIGURE 3 illustrates that the drive shafts 15A and 16A of the friction rollers 15 and 16 extend with a certain amount of clearance through bores in the supporting plate 19 so as to permit the friction rollers 15 and 16 to be moved relative to the drive shaft of the deflecting roller 5. Above the pivotable lever 14, the meshing gears 15B and 16B are mounted on the drive shafts 15A and 16A, respectively. Shaft 15A also has a V-belt pulley 15C secured thereto which is driven by a central drive. Since the gears 15B and 16B mesh with each other, the friction rollers 15 and 16 will be driven in opposite directions.

In FIGURE 4 it may be seen that the supporting plate 19 together with all individual parts of the distributing mechanism forms a structural unit which is to be mounted by means of the angle irons 32 above the conveyer belt 20. FIGURE 4 further shows that the pivot 13 on which the lever 14 is pivotably mounted also serves as a shaft on which several V-belt pulleys are rotatable which are drive by a V-belt 33. The belt 34 on one of these pulleys may be connected, for example, to the drive pulley for the roller 12 and the guide belt 8, belt 35 on another pulley may be connected to the roller 11 for the guide belt 7, and another belt, not shown, on pulley 36 may be connected to the drive pulley 15C, as shown in FIGURE 3, for driving the friction rollers.

Of course, in place of the driving means as above described, it is also possible to provide any other suitable driving means which will accomplish the same purpose.

According to the invention, it is also possible to provide several deflecting mechanisms of the type as described in a series behind each other so that, for example, the two rows of candies which are formed from the original first row will be divided into two further rows. The end of each conveying mechanism for the candies employing, for example, the conveyer belt 20 as described may be located at the end of the guide belts 7 and 8, that is, approximately where the guide rollers 11 and 12 are located.

Although my invention has been illustrated and described with reference to the preferred embodiment thereof, I wish to have it understood that it is in no way limited to the details of such embodiment but is capable of numerous modifications within the scope of the appended claims.

Having thus fully disclosed my invention, what I claim is:

1. A device for aligning and selectively distributing irregularly-shaped articles in two spaced rows, comprising conveyor means, means cooperating with said conveyor means to align articles supported on said conveyor means in a single row extending in the direction of travel of said conveyor means, deflecting means rotatably disposed in alignment with the axis of said single row and having a cylindrical surface extending transversely to the direction of travel of the articles on said conveyer means for contact therewith, and control means for selectively rotating said deflecting means in either direction at a circumferential speed greater than the linear speed of said conveyor means.

2. A mechanism as defined in claim 1, further comprising a pair of guide belts at both sides of said deflecting means, and means for driving each of said guide belts in one direction.

3. A mechanism as defined in claim 1, wherein said control means comprise a pair of friction wheels, means for driving said friction wheels in opposite directions, and means for selectively moving one or the other of said friction wheels into engagement with said deflecting roller.

4. A mechanism as defined in claim 3, wherein said control means further comprise a lever on which said friction wheels are rotatably mounted and spaced from each other at such a distance that, when said lever is pivoted from one end position to another, only one of said friction wheels will engage upon said deflecting means.

5. A mechanism as defined in claim 4, wherein said control means further comprise an electromagnet adapted to pivot said lever.

6. A mechanism as defined in claim 5, wherein said electromagnet when energized is adapted to pivot said lever in one direction, and further comprising spring means tending to pivot said lever in the opposite direction.

7. A mechanism as defined in claim 6, wherein said control means further comprise means controlled by said rows of articles formed on both sides of said deflecting means for actuating said electromagnet.

8. A mechanism as defined in claim 5, wherein said deflecting means, said friction wheels, and said control means are combined so as to form a structural unit adapted to be mounted above said conveyor belt in any suitable position along the length thereof.

References Cited

UNITED STATES PATENTS

| | | | |
|---|---|---|---|
| 465,570 | 12/1891 | Tremper | 74—202 |
| 2,493,464 | 1/1950 | Nelson | 198—40 |
| 2,645,328 | 7/1953 | Winters. | |
| 2,656,910 | 10/1953 | Kraus | 198—30 |
| 2,731,844 | 1/1956 | Washburn | 74—202 |

FOREIGN PATENTS 964,847   5/1957   Germany.

EDWARD A. SROKA, *Primary Examiner.*